C. LINDEMANN.
ATTACHMENT FOR HORSESHOES.
APPLICATION FILED MAR. 22, 1911.
993,848.
Patented May 30, 1911.
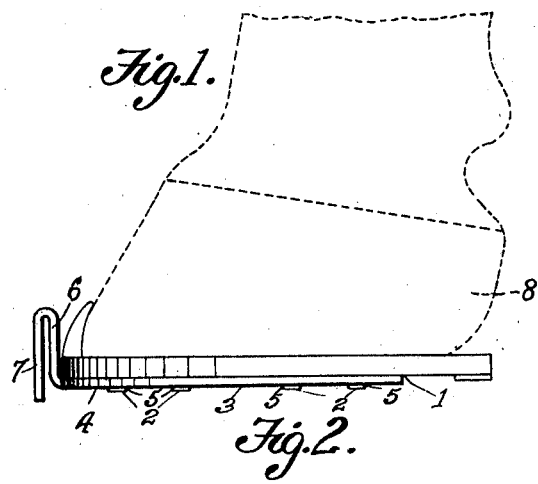
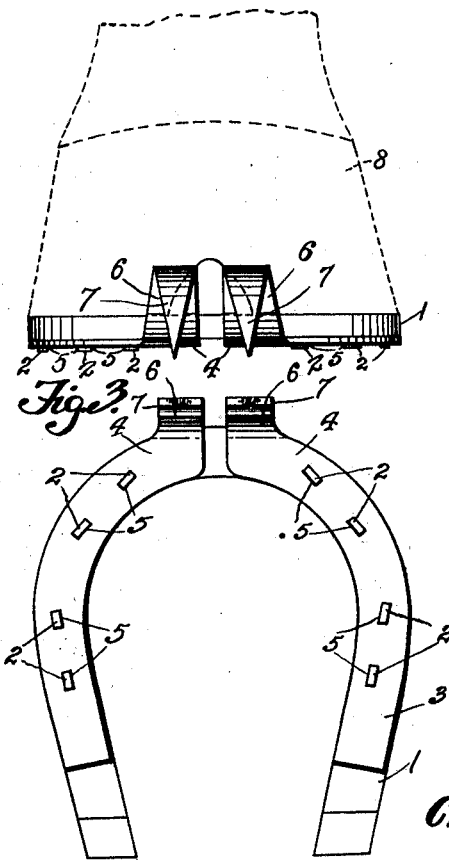
Inventor
Charles Lindemann
Witnesses
By
Attorney

UNITED STATES PATENT OFFICE.

CHARLES LINDEMANN, OF NEW YORK, N. Y.

ATTACHMENT FOR HORSESHOES.

993,848.  Specification of Letters Patent.  Patented May 30, 1911.

Application filed March 22, 1911. Serial No. 616,255.

*To all whom it may concern:*

Be it known that I, CHARLES LINDEMANN, a subject of the Emperor of Germany, residing at New York, in the county of New York and State of New York, have invented certain new and useful Improvements in Attachments for Horseshoes; and I do hereby declare the following to be a full, clear, and exact description of the invention, such as will enable others skilled in the art to which it appertains to make and use the same.

This invention relates to new and useful improvements in attachments for horseshoes.

An object of this invention is the provision of a device of this character, which can be applied to any horseshoe of the usual design, for the purpose of preventing the horse from slipping.

Another object of this invention is the provision of a device of this character which will be comparatively simple and inexpensive to manufacture, reliable and efficient in use, and readily applied or detached at will.

With the above and other objects in view, this invention resides in the novel features of construction, formations, combinations and arrangements of parts to be hereinafter more fully described, claimed and illustrated in the accompanying drawing, in which—

Figure 1 is a side elevation of my invention; Fig. 2 is a front elevation thereof, and Fig. 3 is the bottom plan view.

Referring to the drawing by characters of reference, the numeral 1 designates generally a horseshoe of any desired type or design, having located at intervals throughout its length a series of nail-engaging apertures 2.

My improved attachment, which is applied to the shoe, is indicated by the numeral 3, and consists of a pair of segmental plates 4 formed of cast metal, which have located therein a series of apertures 5, adapted to aline with the before mentioned apertures 2 formed in the shoe 1. The forward terminals of these segmental plates or sections 4 are turned upwardly in front of the shoe at the intermediate portion thereof, as indicated by the numeral 6, and then bent downward, as indicated by the numeral 7, and are adapted to extend slightly below the lowest portion of the shoe.

From the foregoing disclosure it will be apparent that when this attachment is secured to the shoes by the nails which retain the same upon the hook 8, that a device is provided for which will prevent a horse wearing the same from slipping.

Having thus fully described this invention, what I claim as new and desire to secure by Letters Patent is:

An attachment for horseshoes, consisting of a pair of segmental plates adapted to conform with the shape of the horseshoe, said plates being aliningly apertured with the apertures located in the horseshoe, whereby the said segmental plates may be retained upon the horseshoe upon the hoof of a horse, the forward portions of the segmental plates at the intermediate portion of the horseshoe being bent upwardly and then back upon themselves and extending beyond the lowest surface of the horseshoe, substantially as and for the purposes set forth.

In testimony whereof I affix my signature in presence of two witnesses.

CHARLES LINDEMANN.

Witnesses:
ISAAC LIFTIN,
ALEXANDER KAUFMAN.